US011566983B2

(12) United States Patent
Aoyama et al.

(10) Patent No.: US 11,566,983 B2
(45) Date of Patent: Jan. 31, 2023

(54) APPARATUS STATE ESTIMATION DEVICE, APPARATUS STATE ESTIMATION METHOD AND PROGRAM (71) Applicant: Mitsubishi Hitachi Power Systems, Ltd., Kanagawa (JP)

(72) Inventors: Kuniaki Aoyama, Tokyo (JP); Hideaki Kaneko, Tokyo (JP); Masumi Nomura, Tokyo (JP); Yasuoki Tomita, Yokohama (JP); Katsuhiko Abe, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 918 days.

(21) Appl. No.: 16/464,553

(22) PCT Filed: Nov. 28, 2017

(86) PCT No.: PCT/JP2017/042581
§ 371 (c)(1),
(2) Date: May 28, 2019

(87) PCT Pub. No.: WO2018/101248
PCT Pub. Date: Jun. 7, 2018

(65) Prior Publication Data
US 2021/0108999 A1 Apr. 15, 2021

(30) Foreign Application Priority Data
Dec. 2, 2016 (JP) .............................. JP2016-235207

(51) Int. Cl.
*G01N 3/06* (2006.01)
(52) U.S. Cl.
CPC ....... *G01N 3/06* (2013.01); *G01N 2203/0062* (2013.01); *G01N 2203/0071* (2013.01); *G01N 2203/0222* (2013.01)

(58) Field of Classification Search
CPC ............. G01N 3/06; G01N 2203/0062; G01N 2203/0071; G01N 2203/0222;
(Continued)

(56) References Cited

U.S. PATENT DOCUMENTS 6,460,012 B1 * 10/2002 Welch ...................... G01N 3/32
702/182
6,636,813 B1 * 10/2003 Isobe .................... F01D 21/003
702/34
(Continued)

FOREIGN PATENT DOCUMENTS

JP     02-294525     12/1990
JP     07-012709     1/1995
(Continued)

OTHER PUBLICATIONS

International Search Report dated Jan. 30, 2018 in International (PCT) Patent Application No. PCT/JP2017/042581, with English Translation.
(Continued)

*Primary Examiner* — Marrit Eyassu
(74) *Attorney, Agent, or Firm* — Wenderoth, Lind & Ponack, L.L.P.

(57) ABSTRACT

A state quantity acquisition unit acquires a state quantity of a target apparatus including a temperature of the target apparatus. A load specification unit specifies a load history of the target apparatus, based on the state quantity. A remaining life calculation unit calculates a parameter related to a remaining life of the target apparatus for each of a plurality of degradation types, based on the load history specified by the load specification unit.

11 Claims, 9 Drawing Sheets (58) Field of Classification Search
CPC .............. G05B 23/0283; F05D 2260/80; F05D 2270/331; F05D 2270/335; F02C 9/00; F02C 9/28; G06Q 10/04
USPC ............................................................ 73/760
See application file for complete search history.

(56) References Cited

U.S. PATENT DOCUMENTS

| | | | |
|---|---|---|---|
| 2004/0107067 A1* | 6/2004 | Ishii | G05B 23/0283 702/136 |
| 2009/0138211 A1* | 5/2009 | Gobrecht | F01K 13/00 702/34 |
| 2011/0137575 A1* | 6/2011 | Koul | G05B 23/0245 702/34 |
| 2011/0305506 A1 | 12/2011 | Breitenbach et al. | |
| 2013/0191076 A1 | 7/2013 | Jiang et al. | |
| 2014/0244133 A1 | 8/2014 | De Prosperis et al. | |
| 2015/0233789 A1 | 8/2015 | Balandier | |
| 2018/0328290 A1 | 11/2018 | Tanaka et al. | |

FOREIGN PATENT DOCUMENTS

| | | |
|---|---|---|
| JP | 2001-032724 | 2/2001 |
| JP | 2002-073155 | 3/2002 |
| JP | 2003-150237 | 5/2003 |
| JP | 2004-324548 | 11/2004 |
| JP | 2011-058933 | 3/2011 |
| JP | 2011-256865 | 12/2011 |
| JP | 2013-149249 | 8/2013 |
| JP | 2014-522943 | 9/2014 |
| JP | 2017-82681 | 5/2017 |
| WO | 01/023725 | 4/2001 |

OTHER PUBLICATIONS

Written Opinion of the International Searching Authority dated Jan. 30, 2018 in International (PCT) Patent Application No. PCT/JP2017/042581, with English Translation.

* cited by examiner

APPARATUS STATE ESTIMATION DEVICE, APPARATUS STATE ESTIMATION METHOD AND PROGRAM

TECHNICAL FIELD

The present invention relates to an apparatus state estimation device, an apparatus state estimation method, and a program.

Priority is claimed on Japanese Patent Application No. 2016-235207, filed on Dec. 2, 2016, the content of which is incorporated herein by reference.

BACKGROUND ART

PTL 1 discloses a technique for evaluating the remaining life until creep damage occurs and the remaining life due to corrosion in boiler piping.

CITATION LIST

Patent Literature

[PTL 1] Japanese Unexamined Patent Application. First Publication No. 2011-58933

SUMMARY OF INVENTION

Technical Problem

An apparatus operating in a high temperature environment reaches the end of life due to a plurality of types of degradation factors (for example, crack occurrence, crack growth, creep, or the like) due to a load applied to the apparatus. According to the technique described in PTL 1, the remaining life due to creep damage among degradations due to load is specified, but the remaining life due to other degradation factors is not evaluated.

An object of the present invention is to provide an apparatus state estimation device, an apparatus state estimation method, and a program, for appropriately managing the life due to a load applied to a target apparatus for each degradation factor.

Solution to Problem

A first aspect of the present invention provides an apparatus state estimation device including a state quantity acquisition unit that is configured to acquire a state quantity of a target apparatus including a temperature of the target apparatus; a load specification unit that is configured to specify a load history of the target apparatus, based on the state quantity; and a remaining life calculation unit that is configured to calculate a parameter related to a remaining life of the target apparatus for each of a plurality of degradation types, based on the load history specified by the load specification unit.

According to a second aspect of the present invention that provides the apparatus state estimation device according to the first aspect, the load specification unit may specify a stress width for each cycle of stress fluctuation of the target apparatus, based on the state quantity, and the remaining life calculation unit may calculate an accumulated life consumption rate as the parameter, the accumulated life consumption rate being obtained by accumulating for each cycle, a life consumption rate calculated based on a number of life cycles related to crack occurrence in the target apparatus and the stress width specified by the load specification unit.

According to a third aspect of the present invention that provides the apparatus state estimation device according to the second aspect, the remaining life calculation unit may calculate a crack length of the target apparatus as the parameter, based on the stress width specified by the load specification unit, in a case where the accumulated life consumption rate is one or more.

According to a fourth aspect of the present invention, the apparatus state estimation device according to any one of the first to third aspects may further include an operating condition calculation unit that is configured to calculate an operating condition for operating the target apparatus, based on the parameter calculated by the remaining life calculation unit.

According to a fifth aspect of the present invention that provides the apparatus state estimation device according to the fourth aspect may further include a time specification unit that is configured to specify a time in which an operation of the target apparatus needs to be continued, and the operating condition calculation unit may calculate an operating condition for continuing the operation of the target apparatus, during the time specified by the time specification unit, based on the parameter calculated by the remaining life calculation unit.

According to a sixth aspect of the present invention, the apparatus state estimation device according to the fifth aspect may further include an operation allowability determination unit that is configured to determine whether or not the operation is capable of being continued until a predetermined inspection time, in a case where the target apparatus operates in a predetermined operating condition, the time specification unit may specify a time from the present time to the inspection time as the time in which the operation of the target apparatus needs to be continued, and in a case where the operation allowability determination unit determines that the operation is not capable of being continued, the operating condition calculation unit may calculate an operating condition for continuing the operation of the target apparatus, during the time specified by the time specification unit.

According to a seventh aspect of the present invention, the apparatus state estimation device according to the fourth aspect may further include a load input unit that is configured to receive an input of a load for operating the target apparatus, and the operating condition calculation unit may calculate an operating condition when operating the target apparatus with the input load, based on the parameter related to the remaining life.

According to an eighth aspect of the present invention, the apparatus state estimation device according to any one of the fourth to seventh aspects may further include a maintenance information storage unit that is configured to store maintenance information generated in a maintenance work of the target apparatus, and the operating condition calculation unit may calculate the operating condition, based on the maintenance information stored in the maintenance information storage unit.

A ninth aspect of the present invention provides an apparatus state estimation method including a step of acquiring a state quantity of a target apparatus including a temperature of the target apparatus; a step of specifying a load history of the target apparatus, based on the state quantity; and a step of calculating a parameter related to a remaining life of the target apparatus for each of a plurality of degradation types, based on the specified load history.

A tenth aspect of the present invention provides a program causing a computer to function as: a state quantity acquisition unit that is configured to acquire a state quantity of a target apparatus including a temperature of the target apparatus; a load specification unit that is configured to specify a load history of the target apparatus, based on the state quantity; and a remaining life calculation unit that is configured to calculate a parameter related to a remaining life of the target apparatus for each of a plurality of degradation types, based on the load history specified by the load specification unit.

Advantageous Effects of Invention

According to at least one of the above aspects, the apparatus state estimation device calculates a relationship between the load on the turbine and the operable time, based on the load history of the turbine. Thus, the apparatus state estimation device can appropriately manage the life due to the load applied to the target apparatus for each degradation factor.

DESCRIPTION OF EMBODIMENTS

First Embodiment

Hereinafter, a first embodiment will be described in detail with reference to the drawings.

Figure 1:
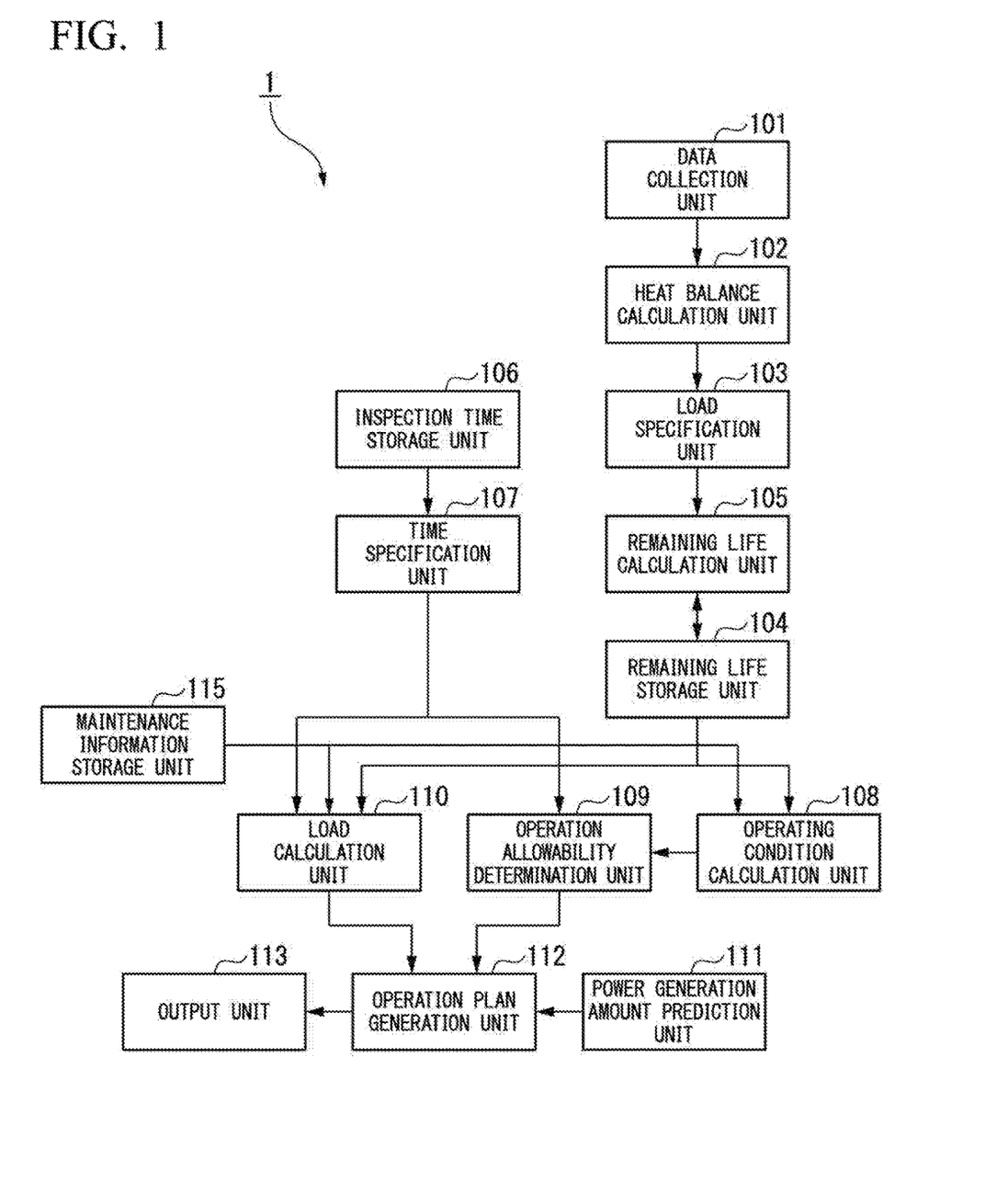
FIG. 1 is a schematic block diagram showing a configuration of a turbine analysis device according to a first embodiment.

FIG. 1 is a schematic block diagram showing a configuration of a turbine analysis device according to a first embodiment.

The turbine analysis device 1 according to the first embodiment generates an operation plan of a plurality of turbines. The operation plan of the turbines according to the first embodiment is information indicating a load related to the operation of each turbine. The turbine analysis device 1 is an example of an apparatus state estimation device in which a target apparatus is a turbine.

A turbine analysis device 1 according to a first embodiment includes a data collection unit 101, a heat balance calculation unit 102, a load specification unit 103, a remaining life storage unit 104, a remaining life calculation unit 105, an inspection time storage unit 106, a time specification unit 107, an operating condition calculation unit 108, an operation allowability determination unit 109, a load calculation unit 110, a power generation amount prediction unit 111, an operation plan generation unit 112, an output unit 113, and a maintenance information storage unit 115.

The data collection unit 101 collects operation data of a turbine in real time from a power plant owned by a customer. Specifically, the data collection unit 101 collects operation data from a sensor provided in the turbine, for each predetermined collection cycle (for example, 5 minutes). The collection cycle is short enough that the immediacy of monitoring is not lost. Examples of the operation data include flow rate, pressure, temperature, vibration, and other state quantities. The data collection unit 101 is an example of a state quantity acquisition unit that acquires a state quantity of a turbine.

The heat balance calculation unit 102 calculates the heat balance of the turbine, based on the operation data collected by the data collection unit 101. The heat balance is the temperature, pressure, enthalpy, flow rate, and other state quantities for each part attached to the turbine. The heat balance calculation unit 102 calculates the heat balance by simulation based on the operation data. Examples of simulation methods for heat balance calculation include finite element method (FEM) and computational fluid dynamics (CFD). The heat balance calculation unit 102 is an example of a state quantity acquisition unit that acquires a state quantity of a turbine.

The load specification unit 103 calculates a Larson-Miller Parameter (LMP) value $L_c$ indicating the degradation amount of each turbine part in the latest collection cycle, based on the heat balance calculated by the heat balance calculation unit 102. The LMP value $L_c$ is a parameter obtained by the following Expression (1).

[Equation 1]

$$L_c = T_c(\log t_c + C) \quad (1)$$

$T_c$ indicates the thermodynamic temperature of a turbine part. The thermodynamic temperature is equivalent to the Celsius temperature plus 273.15. The temperature of the part is specified by the heat balance calculated by the heat balance calculation unit 102. $t_c$ indicates the operating time of a turbine at temperature $T_c$. That is, time $t_c$ is equal to the collection cycle of the data collection unit 101. C is a constant determined by the material of the part. For example, in a case where the material of the part is low carbon steel or chromium molybdenum steel, the constant C may be 20. Further, for example, in a case where the material of the part is stainless steel, the constant C may be 15.

Thus, the LMP value is a parameter specified from the temperature of the part and the operating time. That is, the LMP value is an example of a temperature history variable related to the temperature history applied to the pan. The LMP value can represent the state of the progress of creep degradation. Further, the LMP value is an example of a history of loads applied to the part.

The load specification unit 103 calculates the magnitude of the stress of each part in the latest collection cycle, based on the heat balance calculated by the heat balance calculation unit 102. The load specification unit 103 calculates a stress width for each half cycle of stress fluctuation, based on the calculated magnitude of stress. As a method of specifying a half cycle of stress fluctuation, for example, a cycle counting method such as a rain flow method, a peak counting method, a level crossing counting method, a mean crossing counting method, a range counting method, or a range-pair counting method can be used.

The remaining life storage unit 104 stores parameters regarding the remaining life of each part of the turbine. Specifically, the remaining life storage unit 104 stores the remaining creep life, the low cycle fatigue (LCF) life consumption rate, and the crack length. The remaining creep life is represented by the time until the part reaches the end of life in a case where the turbine operates at the rated temperature. The initial value of the remaining creep life is a designed life relating to creep deformation of the part.

The remaining life calculation unit 105 calculates the remaining creep life of each part of the turbine, based on the LMP value calculated by the load specification unit 103 and the remaining creep life and rated temperature of the part stored in the remaining life storage unit 104. Specifically, the remaining life calculation unit 105 calculates the creep consumption life $t_s$ converted into the operation at the rated temperature by substituting the LMP value $L_c$ and the rated temperature $T_s$ calculated by the load specification unit 103 into the following Expression (2). Then, the remaining life calculation unit 105 calculates the remaining creep life by subtracting the calculated creep consumption life from the remaining creep life stored in the remaining life storage unit 104.

[Equation 2]

$$t_s = 10^{\frac{L_c}{T_s}-C} \quad (2)$$

Figure 2:
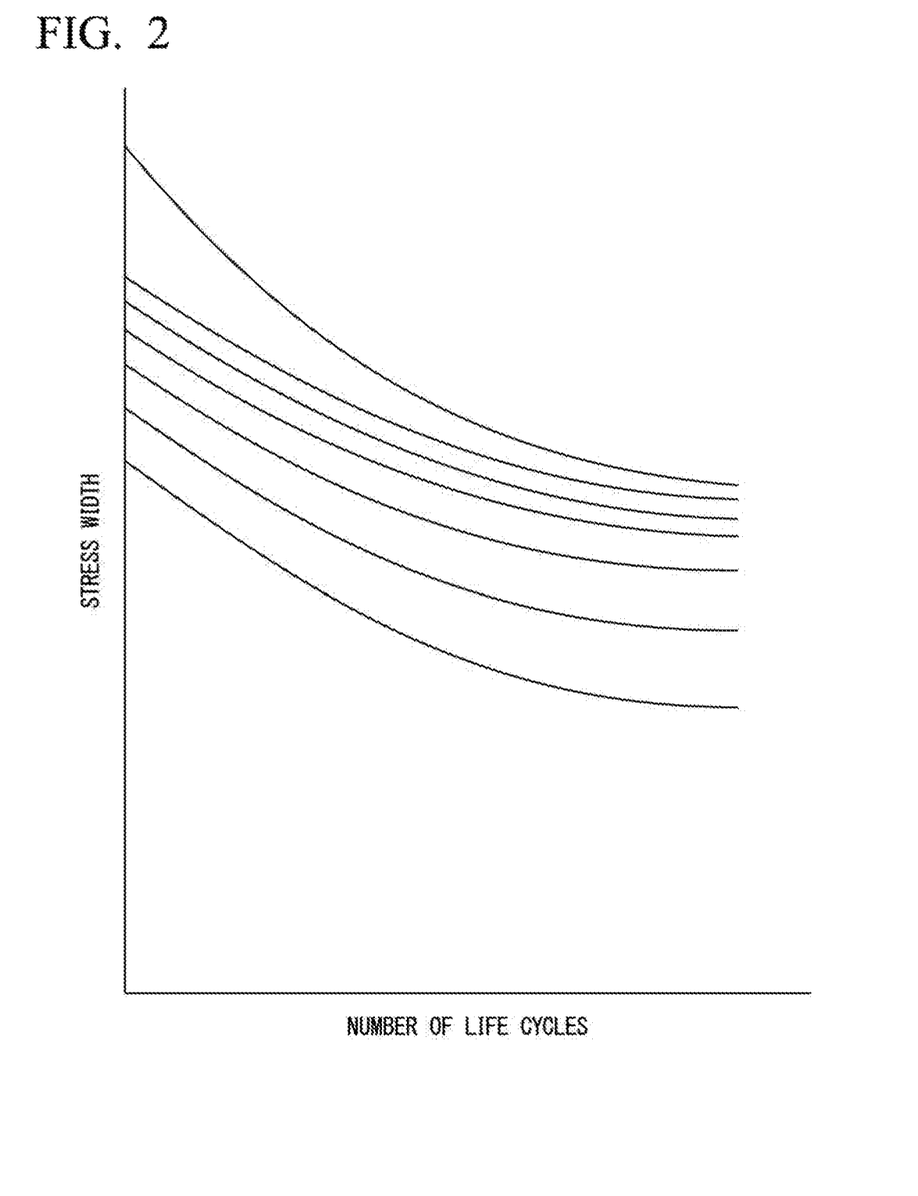
FIG. 2 is a diagram showing an example of LCF diagram data.

FIG. 2 is a diagram showing an example of LCF diagram data. The remaining life calculation unit 105 calculates the LCF life consumption rate of each part of the turbine, based on the stress width for each half cycle calculated by the load specification unit 103 and the LCF diagram data indicating the design life related to the LCF. The LCF diagram data is a data table or a function showing the relationship between the stress width of each part and the number of life cycles, as shown in FIG. 2. Specifically, the remaining life calculation unit 105 specifies the number of life cycles by substituting the stress width into the LCF diagram data, and takes the reciprocal of the number of life cycles to calculate the LCF life consumption rate. The stress width of the part is obtained, for example, by the product of the expansion rate of the part, the Young's modulus of the part, and the change width of the temperature of the part.

The remaining life calculation unit 105 calculates the crack length of the turbine, based on the stress width $\Delta\sigma$ for each half cycle calculated by the load specification unit 103. Paris law or the like can be used for calculation of the crack length. Specifically, the remaining life calculation unit 105 calculates a crack length $a_i$ by substituting the stress width $\Delta\sigma$ calculated by the load specification unit 103 into the following Expression (3).

[Equation 3]

$$n_i = \sum_{a_0}^{a_i} \frac{\Delta a}{C \times \Delta K^m} \quad (3)$$
$$\Delta K = \Delta\sigma \times \sqrt{\pi \times a} \times F(a)$$

Here, $n_i$ is the number of stress cycles, $a_0$ is a crack length stored in the remaining life storage unit 104, $\Delta a$ is a predetermined micro crack length, and C and m are predetermined material coefficients, F(a) is a function for obtaining the shape factor from the crack length. That is, the remaining life calculation unit 105 calculates the crack length $a_i$ by adding the micro crack length $\Delta a$ determined in advance to the crack length $a_0$ until the number of stress cycles $n_i$ becomes the current value, in the Expression (3).

As described above, the remaining life calculation unit 105 calculates parameters related to the remaining life for each of creep deformation, LCF, and crack growth.

The inspection time storage unit 106 stores the inspection time of the turbine.

The time specification unit 107 specifies the time from the present time to the inspection time, based on the inspection time stored in the inspection time storage unit 106. The time from the present time to the inspection time is an example of the time in which the operation of the turbine needs to be continued. Further, the time specification unit 107 specifies the number of times of start of the turbine from the present time to the inspection time, based on the inspection time and the current operation plan.

The operating condition calculation unit 108 calculates the operable time and the number of possible activations of the turbine, in the operation according to the current operation plan, based on the parameters related to the remaining life stored by the remaining life storage unit 104. Specifically, the operating condition calculation unit 108 calculates the LMP value $L_l$ of each part by substituting the remaining creep life $t_l$ stored in the remaining life storage unit 104 and the rated temperature $T_s$ into the following Expression (4).

[Equation 4]

$$L_l = T_s(\log t_l + C) \quad (4)$$

Next, the operating condition calculation unit 108 calculates the operable time $t_p$ by substituting the calculated LMP value $L_l$ and the temperature $T_p$ corresponding to the load indicated by the operation plan into the following Expression (5).

[Equation 5]

$$t_p = 10^{\frac{L_l}{T_p}-C} \quad (5)$$

The operating condition calculation unit 108 calculates the LCF consumption life rate of one cycle of the operation pattern, based on the stress width of the operation pattern according to the current operation plan. The operating condition calculation unit 108 calculates the number of cycles until the crack occurrence by dividing the LCF remaining life rate by the calculated LCF consumption life rate. The LCF remaining life rate is a value obtained by subtracting the LFC consumption life rate stored in the remaining life storage unit 104 from 1. Further, the operating condition calculation unit 108 can calculate the number of cycles $n_i$ until the crack length reaches the design life from the occurrence of the crack, by substituting the stress width $\Delta\sigma$ of the operation pattern according to the current operation plan and the crack length $a_i$ according to the design life into the above Expression (3). The operating condition calculation unit 108 calculates the number of possible activations, by adding the number of cycles until the crack occurrence and the number of cycles until the crack length reaches the design life from the occurrence of the crack.

The operation allowability determination unit 109 determines whether or not the turbine can continue the operation with the load indicated by the operation plan for the time specified by the time specification unit 107, based on the operable time and the number of possible activations calculated by the operating condition calculation unit 108 and the time specified by the time specification unit 107.

The load calculation unit 110 calculates a load that enables the operation of the turbine up to the time specified by the time specification unit 107, based on the parameter related to the remaining life stored by the remaining life storage unit 104. Specifically, the load calculation unit 110 calculates the temperature $T_i$ by substituting the LMP value $L_l$ calculated by the above Expression (4) and the time $t_i$ specified by the time specification unit 107 into the following Expression (6). Next, the load calculation unit 110 specifies the operating load of the turbine, based on the calculated temperature $T_i$.

[Equation 6]

$$T_i = \frac{L_l}{\log t_i + C} \quad (6)$$

The load calculation unit 110 calculates the number of possible activations in a case where the turbine is operated in the operation pattern related to the calculated operating load.

The power generation amount prediction unit 111 acquires market power demand information through the network, and predicts the amount of power that the power plant to be managed needs to generate as a whole.

The operation plan generation unit 112 generates an operation plan indicating the load and the number of times of activation of the turbine, based on the load calculated by the load calculation unit 110, the number of possible activations, and the prediction result by the power generation amount prediction unit 111. Specifically, the operation plan generation unit 112 determines the operation plan up to the inspection time of the turbine which is determined by the operation allowability determination unit 109 to be unable to continue the operation with the load and the number of activations indicated by the current operation plan, as the operation with the load and the number of possible activations calculated by the load calculation unit 110. Then, the operation plan generation unit 112 generates an operation plan of the turbine for which the operation allowability determination unit 109 determines that the operation with the load indicated by the current operation plan can be continued so as to satisfy the power generation amount predicted by the power generation amount prediction unit 111.

The output unit 113 outputs the operation plan generated by the operation plan generation unit 112. Examples of the output format of the operation plan include display on a display, recording on a storage medium, and printing on a sheet.

The maintenance information storage unit 115 stores information generated in the maintenance work of the turbine. For example, the maintenance information storage unit 115 stores information on pats mounted on the turbine, inspection results of the turbine in periodic inspection, repair record information of the turbine, results of survey of materials of the turbine, and the like.

Next, the operation of the turbine analysis device 1 according to the present embodiment will be described.

Figure 3:
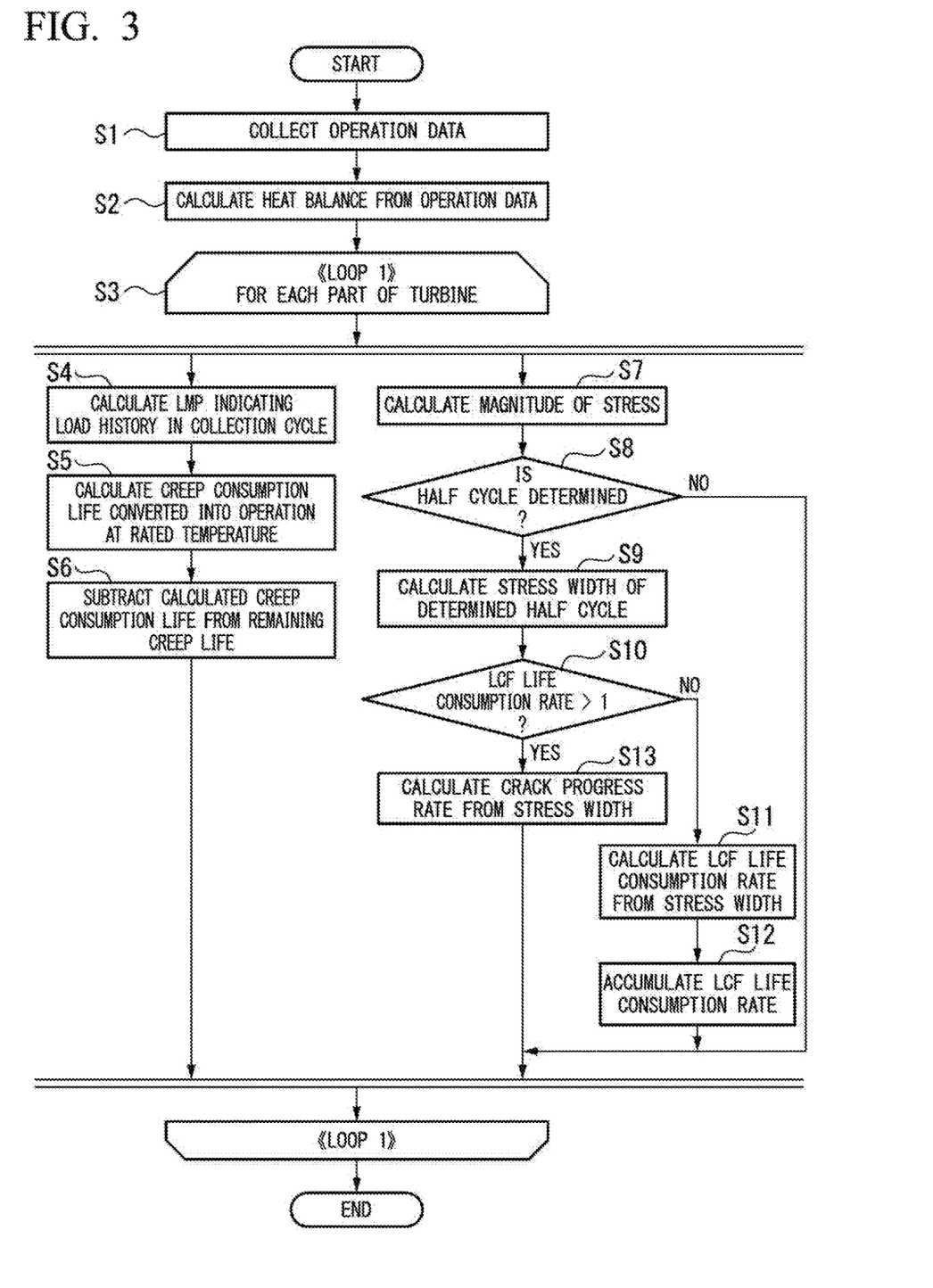
FIG. 3 is a flowchart showing an operation of the turbine analysis device according to the first embodiment at each collection cycle.

FIG. 3 is a flowchart showing an operation of the turbine analysis device according to the first embodiment at each collection cycle.

The turbine analysis device 1 executes the process described below at each collection cycle.

First, the data collection unit 101 collects operation data of a turbine from sensors provided in the turbine (step S1). Next, the heat balance calculation unit 102 calculates the heat balance of the turbine, using the collected operation data as an input (step S2).

Next, the turbine analysis device 1 selects the parts incorporated in the turbine one by one, and executes the process of steps S4 to S6 and the process of steps S7 to S13 shown below for each of the selected parts in parallel (step S3).

First, the load specification unit 103 calculates an LMP value indicating the load history of the selected part, using the heat balance calculated by the heat balance calculation unit 102 (step S4). Next, the remaining life calculation unit 105 calculates the creep consumption life converted into the operation at the rated temperature, based on the LMP value calculated by the load specification unit 103 (step S5). Next, the remaining life calculation unit 105 subtracts the calculated creep consumption life from the remaining creep life stored in the remaining life storage unit 104 (step S6). Thus, the remaining life calculation unit 105 updates the remaining creep life stored in the remaining life storage unit 104.

Further, the load specification unit 103 calculates the magnitude of the stress of the selected part, using the heat balance calculated by the heat balance calculation unit 102 (step S7). Next, the load specification unit 103 determines whether or not a half cycle of stress fluctuation can be determined, based on the magnitude of the stress calculated in step S7 and the magnitude of the stress calculated in the past (step S8). The determination of the half cycle is performed based on the cycle counting method described above. In a case where the half cycle cannot be determined (NO in step S8), the turbine analysis device 1 does not update the parameters related to the low cycle fatigue and the crack length. In a case where the load specification unit 103 determines a half cycle (YES in step S8), the load specification unit 103 calculates a stress width of a half cycle indicating the load history of the selected part (step S9). Next, the remaining life calculation unit 105 determines whether or not the LCF life consumption rate stored by the remaining life storage unit 104 is 1 (100%) or more (step S10). The fact that the LCF life consumption rate is 1 or more indicates that crack occurs in the part selected by LCF.

In a case where the LCF life consumption rate is less than 1 (NO in step S10), that is, a crack due to low cycle fatigue does not occur in the selected part, the remaining life calculation unit 105 calculates the LCF life consumption rate, based on the stress width calculated in step S9 (step S11). Next, the remaining life calculation unit 105 adds the calculated LCF life consumption rate to the LCF life consumption rate stored by the remaining life storage unit 104 (step S12). That is, the remaining life calculation unit 105 calculates an accumulated life consumption rate obtained by accumulating the LCF life consumption rate of each cycle. Thus, the remaining life calculation unit 105 updates the LCF life consumption rate stored in the remaining life storage unit 104.

In a case where the LCF life consumption rate is 1 or more (YES in step S10), that is, a crack due to low cycle fatigue occurs in the selected part, the remaining life calculation unit 105 calculates the crack length, based on the stress width calculated in step S9 and the crack length stored in the remaining life storage unit 104 (step S13). Thus, the remaining life calculation unit 10S updates the crack length stored in the remaining life storage unit 104.

The turbine analysis device 1 executes the process from step S1 to step S6 and the process from step S7 to step S13 in each collection cycle to keep the parameters related to the remaining life of each part stored in the remaining life storage unit 104 for each degradation type in the latest state.

Here, a review process of the operation plan by the turbine analysis device 1 according to the present embodiment will be described. The turbine analysis device 1 reviews the operation plan of each power plant at the timing designated by the user or periodically. That is, the turbine analysis device 1 changes the operation plan such that the parts of all the turbines do not reach the end of life up to the inspection time, in a case where the parts of the turbine are predicted to reach the end of life up to the inspection time by operating the turbine according to the currently used operation plan.

Figure 4:
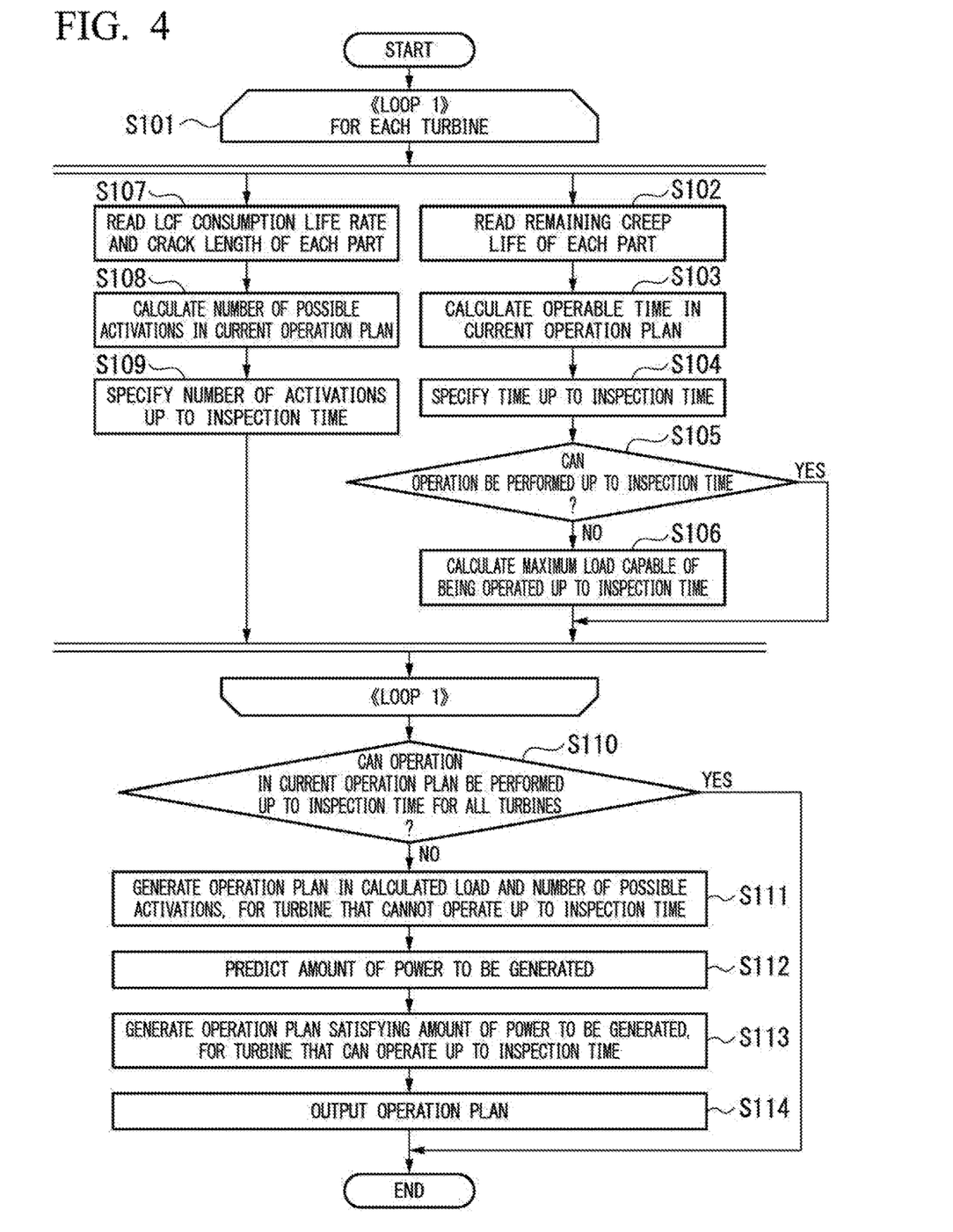
FIG. 4 is a flowchart showing a process of generating an operation plan by the turbine analysis device according to the first embodiment.

FIG. 4 is a flowchart showing a process of generating an operation plan by the turbine analysis device according to the first embodiment.

When starting the review process of the operation plan, the turbine analysis device 1 selects the turbines that is targeted for reviewing the operation plan one by one, and executes the process from step S102 to step S106 shown below and the process from S110 to step S112 in parallel for the selected turbine (step S101).

First, the operating condition calculation unit 108 reads the remaining creep life associated with each part incorporated in the selected turbine from the remaining life storage unit 104 (step S102). Next, the operating condition calculation unit 108 calculates, for each part, the operable time of the operation according to the current operation plan (step S103). At this time, in addition to the remaining creep life, the operating condition calculation unit 108 may further calculate the operable time by using maintenance information stored in the maintenance information storage unit 115. Next, the time specification unit 107 reads the inspection time associated with the selected turbine from the inspection time storage unit 106, and specifies the time from the present time to the inspection time (step S104). Next, the operation allowability determination unit 109 compares the shortest one of the operable times of parts, calculated by the operating condition calculation unit 108, with the time specified by the time specification unit 107, and determines whether or not the operation according to the current operation plan can be performed up to the next inspection time (step S105).

In a case where the operation allowability determination unit 109 determines that the operation according to the current operation plan can be performed up to the next inspection time for the selected turbine (YES in step S105), the turbine analysis device 1 returns to step S101, and selects the next turbine. On the other case, in a case where the operation allowability determination unit 109 determines that the operation according to the current operation plan cannot be performed up to the next inspection time for the selected turbine (NO in step S105), the load calculation unit 110 calculates the maximum load with which the selected turbine can be operated during the time specified by the time specification unit 107, for each part (step S106). At this time, the load calculation unit 110 may calculate the maximum load with which the selected turbine can be operated, using the maintenance information stored in the maintenance information storage unit 15.

Further, the operating condition calculation unit 108 reads the LCF consumption life rate and the crack length associated with each part incorporated in the selected turbine from the remaining life storage unit 104 (step S107). Next, the operating condition calculation unit 108 calculates, for each part, the number of possible activations in the operation according to the current operation plan (step S108). At this time, in addition to the LCF consumption life rate and the crack length, the operating condition calculation unit 108 may specify the number of possible activations using maintenance information stored in the maintenance information storage unit 115.

Next, the time specification unit 107 reads the inspection time associated with the selected turbine from the inspection time storage unit 106, and specifies the number of activations from the present time to the inspection time based on the current operation plan (step S109).

If the turbine analysis device 1 executes the processing from step S102 to step S106 for all the turbines, the operation plan generation unit 112 determines whether or not the operation according to the current operation plan can be performed up to the next inspection time, for all the turbines (step S110). That is, the operation plan generation unit 112 determines whether or not all the determination result by the operation allowability determination unit 109 in step S105 are YES and the number of possible activations calculated in step S108 is more than or equal to the number of activation specified in step S109. Ina case where the operation according to the current operation plan can be performed up to the next inspection time for all the turbines (YES in step S110), because there is no need to change the operation plan, the turbine analysis device 1 ends the process without generating a new operation plan.

On the other hand, in a case where there is a turbine that cannot operate according to the current operation plan up to the next inspection time (NO in step S110), the operation plan generation unit 112 generates an operation plan for operating the turbine that cannot operate according to the operation plan with the load calculated by the load calculation unit 110 or the number of possible activations calculated by the operating condition calculation unit 108, until the inspection period (step S111). The power generation amount prediction unit 111 acquires market power demand information through the network, and predicts the amount of power needed to be generated by the power plant to be managed (step S112). Next, the operation plan generation unit 112 generates an operation plan of the turbine that is targeted for inspection so as to satisfy the predicted power amount (step S113). Specifically, the operation plan generation unit 112 calculates the power generation amount sharing of the turbines in which the operation according to the operation plan is determined to be possible to perform in step S105, so as to satisfy the power generation amount predicted by the power generation amount prediction unit 111.

Then, the output unit 113 outputs the operation plan generated by the operation plan generation unit 112 (step S114).

As described above, the turbine analysis device 1 according to the present embodiment calculates the parameter related to the remaining life of the turbine, for each of the plurality of degradation types, based on the load history of the turbine. Specifically, the remaining life calculation unit 105 calculates a creep consumption life that is a parameter related to creep deformation, an LCF life consumption rate that is a parameter related to LCP, and a crack length that is a parameter related to crack growth.

Thus, the turbine analysis device 1 can appropriately manage the life of the turbine according to the load.

In addition, the turbine analysis device 1 according to the present embodiment specifies the stress width for each cycle of stress fluctuation in the turbine, and calculates an accumulated life consumption rate by accumulating the LCF life consumption rate calculated for each cycle based on the number of life cycles relating to crack occurrence and the stress width. Thus, the turbine analysis device 1 can calculate the number of activations until crack occurs in the turbine. In addition, the turbine analysis device 1 according to the present embodiment calculates the crack length of the turbine based on the stress width, in a case where the accumulated life consumption rate is 1 or more. Thus, the turbine analysis device 1 can calculate the number of activations until the length of the crack reaches the crack length related to the design life, after crack occurs in the turbine by the LCF.

In addition, in a case where the turbine cannot continue the operation until an inspection time with the load or the number of activations indicated by the current operation plan, the turbine analysis device 1 according to the present embodiment calculates the load and the number of possible activations with which the turbine can continue the operation until the inspection time. Thus, the turbine analysis device 1 can change the operation plan such that parts do not reach the end of life before the inspection time, in a case where the high temperature parts have a possibility of reaching the end of life before the inspection time.

In addition, the turbine analysis device 1 according to the present embodiment generates an operation plan of each of the plurality of turbines, based on the prediction of the amount of power needed to be generated by the plurality of turbines. Thus, even if the operation plan of some of the turbines is changed so as not to reach the end of life, the turbine analysis device 1 can change the operation plans of the remaining turbines such that the total power generation amount satisfies the predicted power amount.

Second Embodiment

Hereinafter, a second embodiment will be described in detail with reference to the drawings.

In the first embodiment, the turbine analysis device 1 determines the operating load of each turbine. On the other hand, in the second embodiment, the owner of the turbine sets the operating load of each turbine. The turbine analysis device 1 according to the second embodiment calculates and presents the operable time of the turbine under the operating load input by the owner.

Figure 5:
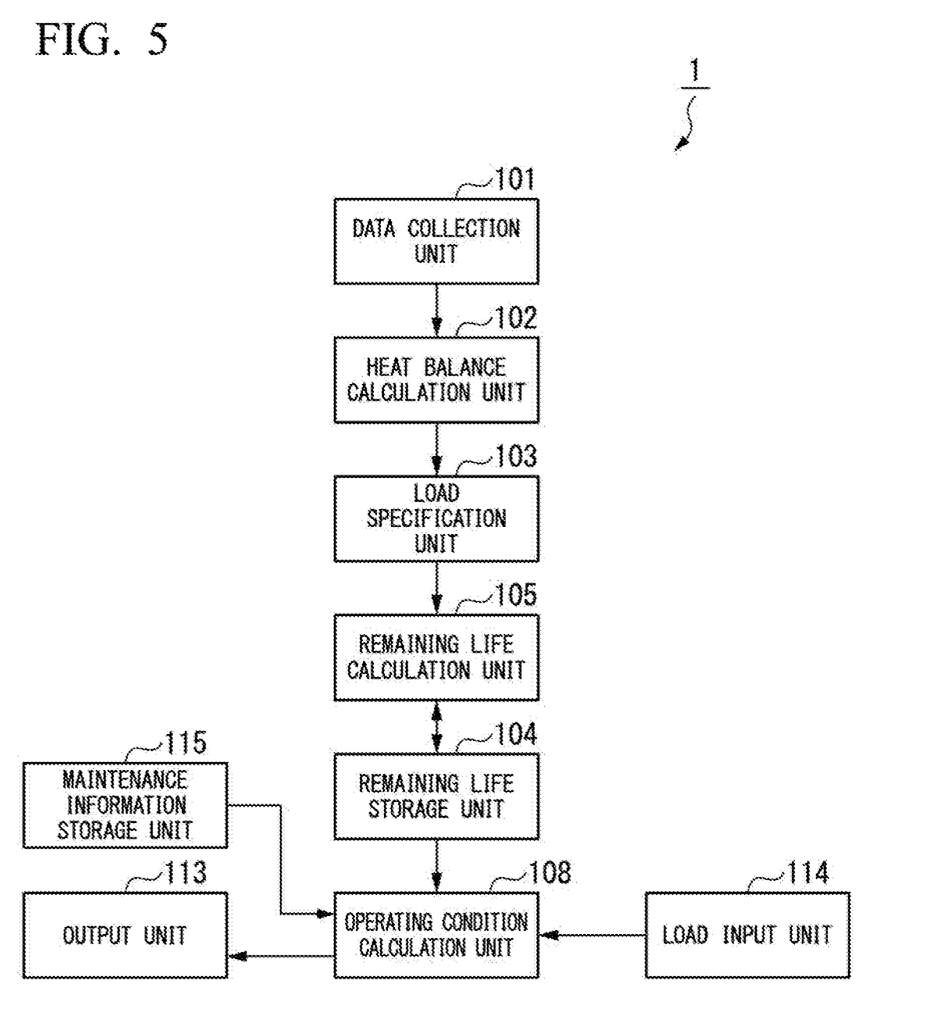
FIG. 5 is a schematic block diagram showing a configuration of a turbine analysis device according to a second embodiment.

FIG. 5 is a schematic block diagram showing a configuration of a turbine analysis device according to a second embodiment. The turbine analysis device 1 according to the second embodiment does not include the inspection time storage unit 106, the time specification unit 107, the operation allowability determination unit 109, the load calculation unit 110, the power generation amount prediction unit 111, and the operation plan generation unit 112 from the configuration of the first embodiment. On the other hand, the turbine analysis device 1 according to the second embodiment further includes a load input unit 114 in addition to the configuration of the first embodiment.

The load input unit 114 receives an input of the operating load of the turbine from the owner.

The operating condition calculation unit 108 calculates the operable time and the number of possible activations in a case where the turbine is operated with the operating load that is input to the load input unit 114, based on the parameters related to the remaining life stored by the remaining life storage unit 104.

The output unit 113 outputs the operable time and the number of possible activations calculated by the operating condition calculation unit 108.

Figure 6:
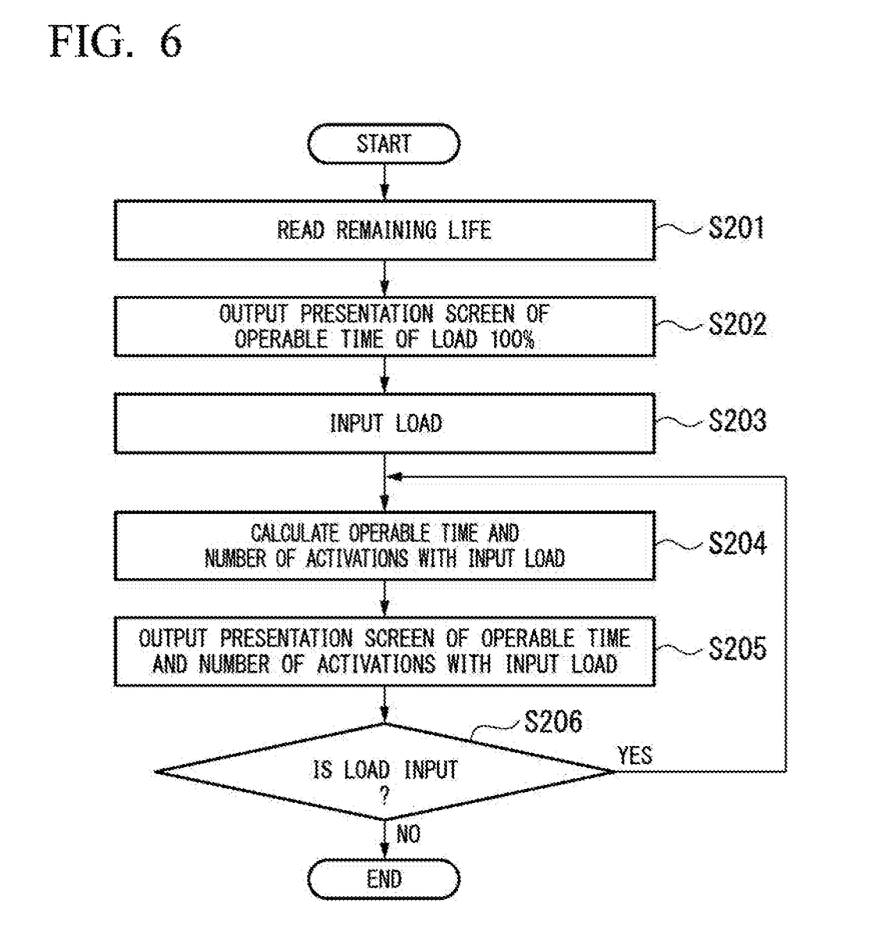
FIG. 6 is a flowchart showing a process of presenting operating conditions by the turbine analysis device according to the second embodiment.

FIG. 6 is a flowchart showing a process of presenting operating conditions by the turbine analysis device according to the second embodiment.

Figure 7:
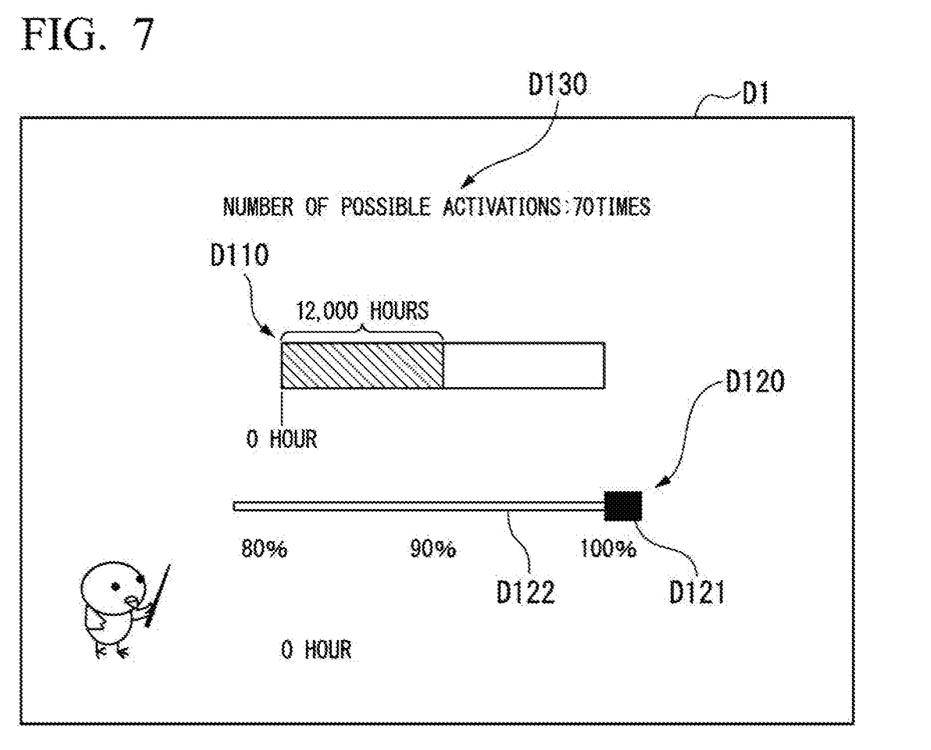
FIG. 7 is a view showing a first example of an operating condition presentation screen output by the turbine analysis device according to the second embodiment.

FIG. 7 is a view showing a first example of the operating condition presentation screen output by the turbine analysis device according to the second embodiment.

The turbine analysis device 1 starts the process of presenting the operable time upon receiving a request for presenting the operable time from the owner of the turbine. The operating condition calculation unit 108 reads the remaining creep life, the LCF life consumption rate, and the crack length of the turbine for which the operable time is to be presented, from the remaining life storage unit 104 (step S201). Next, the output unit 113 outputs to the display, a presentation screen D1 for presenting the operable time and the number of possible activations at the time of load 100%, based on the remaining creep life, the LCF life consumption rate, and the crack length, read by the operating condition calculation unit 108, as an initial screen, as shown in FIG. 7 (step S202). The presentation screen D1 is a screen including an operable time bar D110, a load bar D120, and an indication D130 for the number of possible activations. The operable time bar D110 is an indicator indicating the operable time by its length. The longer the operable time of the turbine, the longer the length of the operable time bar D110. On the other hand, the shorter the operable time of the turbine, the shorter the length of the operable time bar D110. The load bar D120 is a slider that receives an input of the operating load of the turbine. The load bar D120 includes a handle D121 and a track D122. The handle D121 can select any load by being dragged and dropped on the track D122. The track D122 represents the movable range of the handle D121.

The load input unit 114 receives an input of a load by receiving the operation of the handle D121 of the load bar D120 from the owner (step S203). Next, the operating condition calculation unit 108 calculates the operable time and the number of possible activations in a case where the turbine is operated with the load input to the load input unit 114, based on the parameter regarding the remaining life read in step S201 (step S204).

Specifically, the operating condition calculation unit 108 calculates the LMP value $L_l$, by substituting the remaining creep life $t_l$ and the rated temperature $T_s$ read in step S201 into the above-described Expression (4), and calculates the operable time $t_p$, by substituting the calculated LMP value $L_l$ and the temperature $T_p$ corresponding to the load input to the load input unit 114 into the above-described Expression (5). Further, the operating condition calculation unit 108 calculates the number of cycles up to crack occurrence and the number of cycles until the crack length reaches the design life from the occurrence of the crack, based on the stress width of the operation pattern related to the load input to the load input unit 114, and calculates the number of activations by adding both the numbers of cycles. Further, the operating condition calculation unit 108 may further calculate the operable time and the number of possible activations, using the maintenance information stored in the maintenance information storage unit 115, in addition to the parameters relating to the remaining life.

Figure 8:
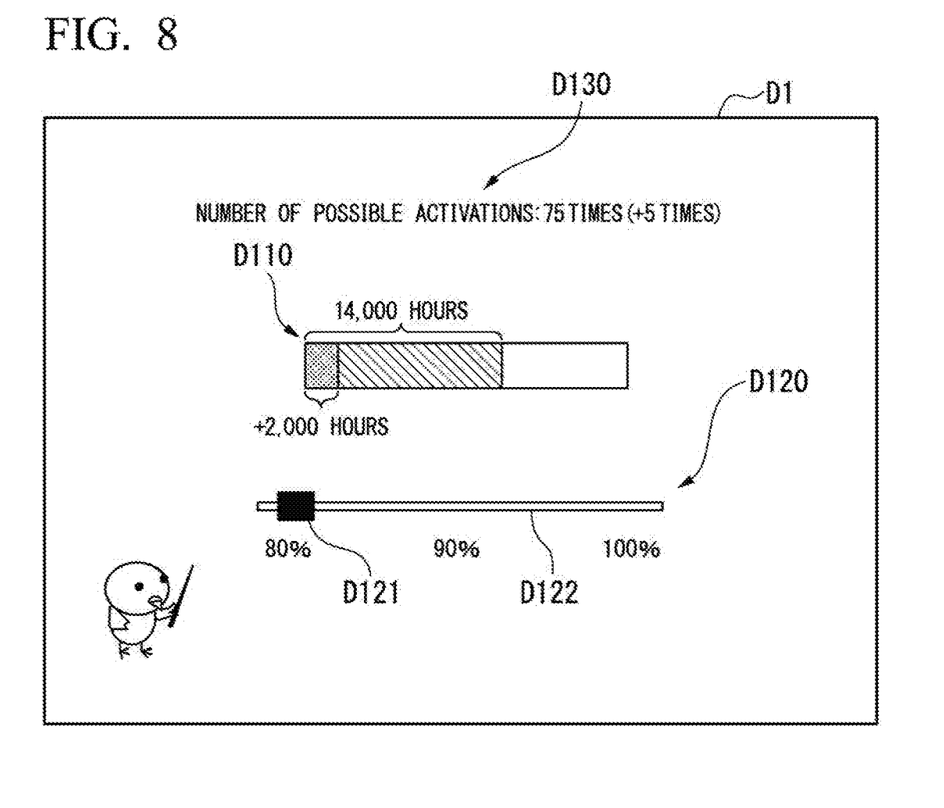
FIG. 8 is a view showing a second example of the operating condition presentation screen output by the turbine analysis device according to the second embodiment.

FIG. 8 is a view showing a second example of the operating condition presentation screen output by the turbine analysis device according to the second embodiment.

Next, as shown in FIG. 8, the output unit 113 outputs, to the display, the presentation screen D1 for presenting the operable time calculated by the operating condition calculation unit 108 (step S205). As shown in FIG. 8, when an operation load of less than 100% is input to the load input unit 114, the length of the operable time bar D110 becomes longer than that presented in step S202. At this time, an increase from the operable time presented in step S202 is displayed on the operable time bar D110 in a different appearance (for example, color, pattern, or the like). For example, in a case where the operable time at load 100% is 12000 hours as shown in FIG. 7, and the operable time at load 80% is 14000 hours as shown in FIG. 8, 2000 hours equivalent to an increment of the operable time bar D110 are displayed in different appearance. Further, as shown in FIG. 8, when a driving load of less than 100% is input to the load input unit 114, the number of possible activations indicated in the indication D130 for the number of possible activations becomes larger than that presented in step S202 depending on the situation. At this time, the indication D130 for the number of possible activations includes an increase of the number of possible activations.

As a result, it possible for the owner to know the amount of increase in the operable time and the number of possible activations due to the change in load.

Next, the load input unit 114 determines whether or not there is further an input of the operating load from the user (step S206). In a case where the operating load is input to the load input unit 114 (YES in step S206), the turbine analysis device 1 returns the process to step S204, and recalculates the operable time and the number of possible activations. On the other hand, in a case where the operating load is not input to the load input unit 114 (NO in step S206), the turbine analysis device 1 ends the process.

As described above, the turbine analysis device 1 according to the present embodiment receives the input of the load of the turbine, and calculates the operable time in a case where the turbine is operated with the load. Thus, the turbine analysis device 1 can present the operable time and the number of possible activations in a case where the owner changes the load on the turbine.

As described above, although an embodiment has been described in detail with reference to drawings, a concrete configuration is not limited to the above description, and various design changes or the like are possible.

In the above-described embodiment, for each part of the turbine, cracks up to the crack length related to the design life are allowed, but the present invention is not limited thereto. For example, in other embodiments, crack may not be acceptable in some or all of turbine parts. In this case, the turbine analysis device 1 calculates the number of cycles up to crack occurrence as the number of possible activations, not the sum of the number of cycles up to crack occurrence and the number of cycles until the crack length reaches the design life from the occurrence of the crack.

In the above-described embodiment, the degradation types for which the remaining life is to be calculated are creep deformation, LCF, and crack growth, but the present invention is not limited thereto. For example, in other embodiments, some of the degradation types may be used to calculate the remaining life, or other degradation types (for example, wear of thermal barrier coating (TBC), high temperature oxidation reduction, erosion, or the like) may be used to calculate the remaining life.

In the embodiment described above, although the turbine analysis device 1 calculates the operable time and the number of possible activations of the whole turbine, based on the parameters related to the remaining life of each part constituting the turbine, the present invention is not limited thereto. For example, the turbine analysis device 1 according to another embodiment may directly calculate the remaining life of whole turbine, based on the design life of the whole turbine without calculating the remaining life of each part thereof.

In the embodiment described above, although the load specification unit 103 performs the calculation based on the heat balance calculated by the heat balance calculation unit 102, the present invention is not limited to thereto. For example, in another embodiment, the load specification unit 103 may perform the calculation based on the operation data collected by the data collection unit 101. In this case, the turbine analysis device 1 may not include the heat balance calculation unit 102.

In the embodiment described above, although the case where a turbine is a target apparatus has been described, the present invention is not limited to thereto. For example, in another embodiment, another apparatus, such as a turbocharger or a boiler that causes thermal degradation due to operation may be the target apparatus. As in the above-described embodiment, by using a turbine (in particular, a gas turbine) having a huge number of types and parts as target apparatus, it is possible to manage the life consumption of a part in detail for each of a huge number of parts, based on the usage history and the life consumption rate. In addition, even in the case of equipment in which parts having different usage histories and consumption rates are mixed, it is possible to accurately simulate the optimum operation of the equipment.

Figure 9:
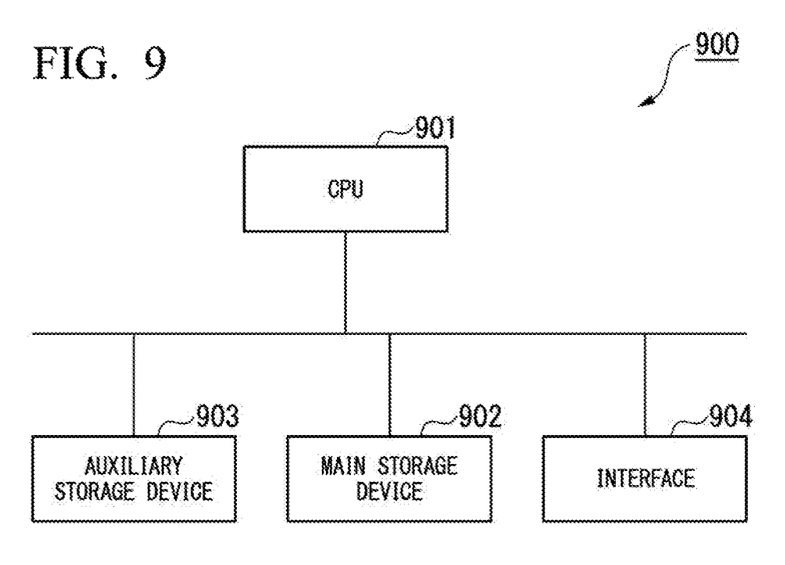
FIG. 9 is a schematic block diagram showing a configuration of a computer according to at least one embodiment.

FIG. 9 is a schematic block diagram showing a configuration of a computer according to at least one embodiment.

The computer 900 includes a CPU 901, a main storage device 902, an auxiliary storage device 903, and an interface 904.

The above-described turbine analysis device 1 is mounted on the computer 900. The operation of each of the above-described processing units is stored in the auxiliary storage device 903 in the form of a program. The CPU 901 reads the program from the auxiliary storage device 903, develops the program into the main storage device 902, and executes the above process according to the program. The CPU 901 secures in the main storage device 902, a storage area corresponding to each of the above-described storage units in accordance with the program.

In at least one embodiment, the auxiliary storage device 903 is an example of a non-transitory tangible medium. Other examples of non-transitory tangible medium include magnetic disks, magneto-optical disks, CD-ROMs, DVD-ROMs, semiconductor memories, and the like connected through the interface 904. Further, when this program is delivered to the computer 900 through a communication line, the computer 900 receiving the delivered program may develop the program in the main storage device 902 and execute the above process.

Further, the program may be for realizing part of the above-described functions. Further, the program may be a so-called differential file (differential program) which realizes the above-described function in combination with other programs already stored in the auxiliary storage device 903.

INDUSTRIAL APPLICABILITY

According to the above embodiment, the apparatus state estimation device can appropriately manage the life due to the load applied to the target apparatus for each degradation factor.

REFERENCE SIGNS LIST

1 turbine analysis device
101 data collection unit
102 heat balance calculation unit
103 load specification unit
104 remaining life storage unit
105 remaining life calculation unit
106 inspection time storage unit
107 time specification unit
108 operating condition calculation unit
109 operation allowability determination unit
110 load calculation unit
111 power generation amount prediction unit
112 operation plan generation unit
113 output unit
114 load input unit
900 computer
901 CPU
902 main storage device
903 auxiliary storage device
904 interface

The invention claimed is:

1. An apparatus state estimation device comprising:
a state quantity acquisition unit that is configured to acquire a temperature of a target apparatus;
a load specification unit that is configured to specify a stress width for each cycle of stress fluctuation of the target apparatus, based on a change width of the temperature; and
a remaining life calculation unit that is configured to calculate a parameter related to a crack occurrence for a remaining life of the target apparatus from the stress width specified by the load specification unit, based on a relationship between the stress width and a number of life cycles related to crack occurrence in the target apparatus, and calculate a parameter related to a crack growth for the remaining life of the target apparatus from the stress width, based on a relationship between a crack length to be formed per unit cycle,
wherein the remaining life calculation unit calculates the parameter related to the crack growth in a case where the parameter related to the crack occurrence indicates an occurrence of a crack in the target apparatus.

2. The apparatus state estimation device according to claim 1,
wherein the remaining life calculation unit calculates, as the parameter related to the crack occurrence, an accumulated life consumption rate obtained by accumulating a life consumption rate of each cycle calculated based on the number of life cycles and the stress width specified by the load specification unit.

3. The apparatus state estimation device according to claim 2,
wherein the remaining life calculation unit calculates a crack length of the target apparatus as the parameter related to the crack growth, based on the stress width specified by the load specification unit, in a case where the accumulated life consumption rate is one or more.

4. The apparatus state estimation device according to claim 1, further comprising:
an operating condition calculation unit that is configured to calculate an operating condition for operating the target apparatus, based on the parameter related to the crack occurrence and the parameter related to the crack growth.

5. The apparatus state estimation device according to claim 4,
wherein the operating condition calculation unit calculates an operating condition for continuing the operation of the target apparatus, during a time in which an operation of the target apparatus needs to be continued, based on the parameter related to the crack occurrence and the parameter related to the crack growth.

6. The apparatus state estimation device according to claim 5, further comprising:
an operation allowability determination unit that is configured to determine whether or not the operation is capable of being continued until a predetermined inspection time, in a case where the target apparatus operates in a predetermined operating condition,
wherein the time in which the operation of the target apparatus needs to be continued is a time until the predetermined inspection time, and
wherein in a case where the operation allowability determination unit determines that the operation is not capable of being continued, the operating condition calculation unit calculates an operating condition for continuing the operation of the target apparatus, during the time specified by the time specification unit.

7. The apparatus state estimation device according to claim 4, further comprising:
a load input unit that is configured to receive an input of a load for operating the target apparatus,
wherein the operating condition calculation unit calculates an operating condition when operating the target apparatus with the input load, based on the parameter related to the crack occurrence and the parameter related to the crack growth.

8. The apparatus state estimation device according to claim 4, further comprising:
a maintenance information storage unit that is configured to store maintenance information generated in a maintenance work of the target apparatus,
wherein the operating condition calculation unit calculates the operating condition, based on the maintenance information stored in the maintenance information storage unit.

9. The apparatus state estimation device according to claim 1,
wherein the remaining life calculation unit determines whether or not a low cycle fatigue (LCF) life consumption rate being the parameter related to the crack occurrence is 1 or more, and
the remaining life calculation unit calculates the parameter related to the crack growth in a case where the LCF life consumption rate indicates an occurrence of a crack in the target apparatus.

10. An apparatus state estimation method comprising:
a step of acquiring a temperature of a target apparatus;
a step of specifying a stress width for each cycle of stress fluctuation of the target apparatus, based on a change width of the temperature; and a step of calculating a parameter related to a crack occurrence for a remaining life of the target apparatus from the stress width specified, based on a relationship between the stress width and a number of life cycles related to crack occurrence in the target apparatus, and calculating a parameter related to a crack growth for the remaining life of the target apparatus from the stress width specified, based on a relationship between a crack length to be formed per unit cycle, wherein the step of calculating comprises calculating the parameter related to the crack growth in a case where the parameter related to the crack occurrence indicates an occurrence of a crack in the target apparatus.

11. A non-transitory computer-readable computer medium storing a program causing a computer to function as:

a state quantity acquisition unit that is configured to acquire a temperature of a target apparatus;

a load specification unit that is configured to specify a stress width for each cycle of stress fluctuation of the target apparatus, based on a change width of the temperature; and a remaining life calculation unit that is configured to calculate a parameter related to a crack occurrence for a remaining life of the target apparatus from the stress width specified, based on a relationship between the stress width and a number of life cycles related to crack occurrence in the target apparatus, and calculate a parameter related to a crack growth for the remaining life of the target apparatus from the stress width specified, based on a relationship between a crack length to be formed per unit cycle, wherein the remaining life calculation unit calculates the parameter related to the crack growth in a case where the parameter related to the crack occurrence indicates an occurrence of a crack in the target apparatus.

* * * * *